United States Patent [19]
Davis

[11] Patent Number: 5,986,864
[45] Date of Patent: Nov. 16, 1999

[54] INTERCALATION-BASED VOLTAGE VARIABLE CAPACITOR

[75] Inventor: James Lynn Davis, Parkland, Fla.

[73] Assignee: Motorola, Inc., Schaumburg, Ill.

[21] Appl. No.: 09/078,798

[22] Filed: May 14, 1998

Related U.S. Application Data

[62] Division of application No. 08/560,455, Nov. 17, 1995, Pat. No. 5,771,148.
[51] Int. Cl.⁶ ...................................................... H02H 9/00
[52] U.S. Cl. ............................... 361/58; 361/15; 361/111; 361/113
[58] Field of Search ................................ 361/15, 58, 115, 361/113, 111

[56] References Cited

U.S. PATENT DOCUMENTS

| | | | |
|---|---|---|---|
| 3,560,815 | 2/1971 | Sigsbee | 317/235 |
| 5,192,871 | 3/1993 | Ramakrishnan et al. | 257/595 |
| 5,283,462 | 2/1994 | Stengel | 257/595 |
| 5,351,164 | 9/1994 | Grigortchak | 361/502 |
| 5,390,072 | 2/1995 | Anderson et al. | 361/363 |

OTHER PUBLICATIONS

*Physical Review*, Gorochov, O., Ghorayeb, A. M., Optical and Electrical–Transport Studies on Lithium–Intercalated $TiS_2$, pp. 4–9, vol. 45, No. 23, Jun. 15, 1992.

*Solid State Ionics*, Godshall, N.A., Lithium Transport in Ternary Lithium–Copper–oxygen Cathode Materials, pp. 788–793, Elscvier Science Publishers B.V. (North–Holland Physics Publishing Division) No. D 167–2738/86.

*Primary Examiner*—Stephen W. Jackson
*Attorney, Agent, or Firm*—Dale W. Dorinski

[57] ABSTRACT

A voltage variable capacitor (VVC) is made by placing an intercalation compound between two electrodes of a capacitor. The VVC has a reservoir of an intercalant in proximity with the intercalation compound. The two materials are chosen from those known to exhibit the intercalation reaction. The extent of the intercalation reaction is controlled by applying a voltage to the intercalant reservoir and the intercalation compound. A variable capacitor is created by applying a signal to the device and appropriately controlling the $\epsilon$ of the device by using the input control voltages.

6 Claims, 1 Drawing Sheet

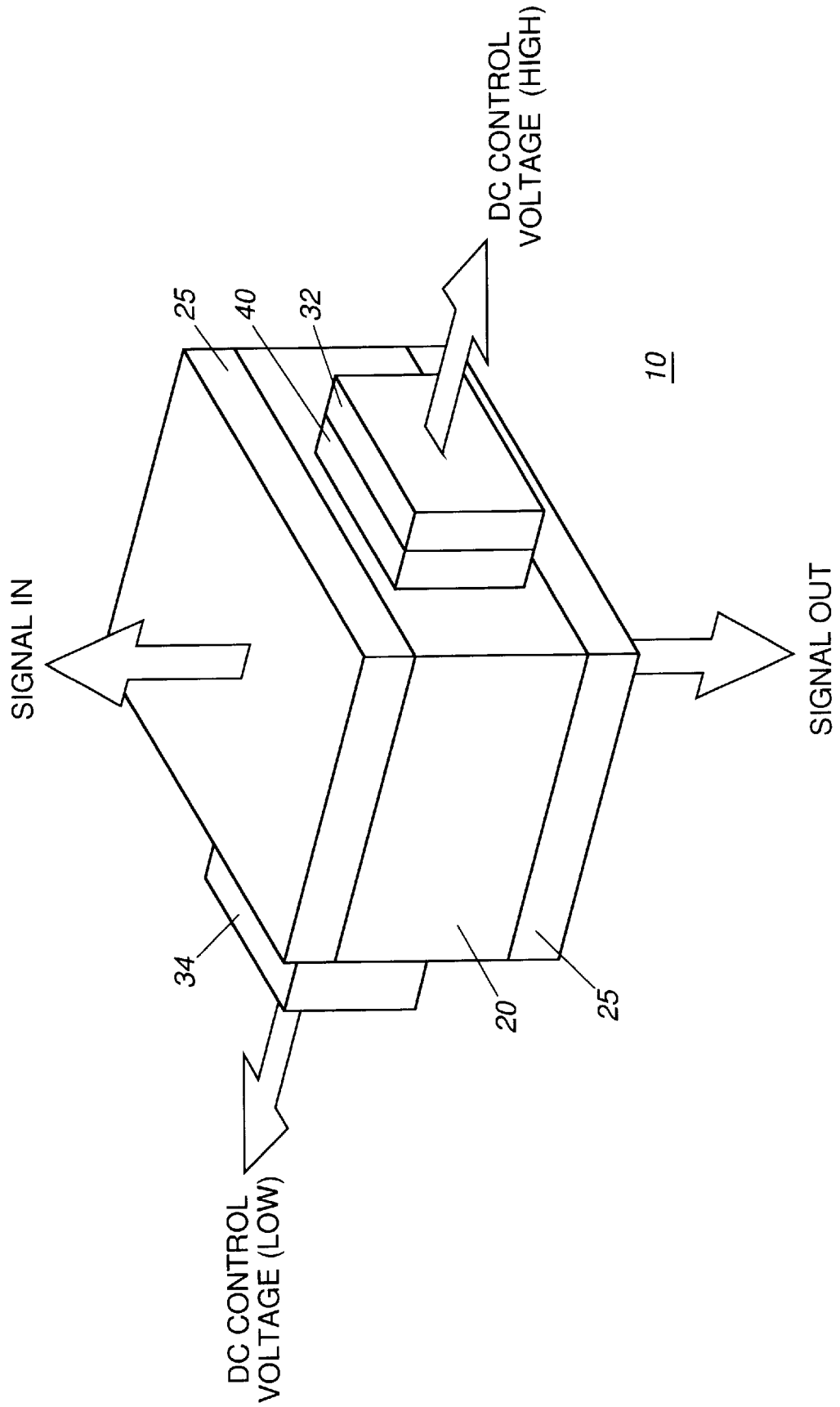

INTERCALATION-BASED VOLTAGE VARIABLE CAPACITOR

CROSS-REFERENCE TO RELATED APPLICATIONS

This application is a divisional of Ser. No. 08/560,455 filed Nov. 17, 1995, now U.S. Pat. No. 5,771,148 by James L. Davis.

TECHNICAL FIELD

This invention relates in general to capacitors, and more specifically to voltage variable capacitors.

BACKGROUND

A typical capacitor has a pair of electrode layers with a dielectric material therebetween. Voltage is applied across the electrode layers in order to store a charge in the capacitor, with the amount of charge being storable in the capacitor, e.g. the capacitance, being proportional to the opposing areas of the electrodes and to the dielectric constant of the dielectric material. Capacitance has also been found to be inversely proportional to the thickness of the dielectric material, thus thin film capacitors are generally seen as a preferable means to achieve high capacitance. Problems still exist in optimizing the performance of these types of capacitors so there is a continuing need to improve electrical properties such as attaining higher dielectric constants, lowering the charge dissipation factors, and lowering the leakage currents.

A voltage variable capacitor, also known as a varactor, a variable capacitance diode or varacap, is a semiconductor device characterized by voltage sensitive capacitance which resides in the space charge region at the surface of a semiconductor bounded by an insulating layer. In order to form a high performance voltage variable capacitor a dielectric film having a very thin cross section and an extremely high integrity is required to be deposited on a semi conductive substrate. U.S. Pat. Nos. 5,192,871 and 5,390,072, incorporated herein by reference, describe the construction and use of semiconductor voltage variable capacitors. Although both of these patents suggest significant improvements in the art, a need still exists for making a voltage variable capacitor that does not rely upon the use of a semiconductive substrate. Clearly it would be an addition to the art if a capacitor could be realized that could have a variable capacitance and did not rely on a semiconductor.

BRIEF DESCRIPTION OF THE DRAWINGS

FIG. 1 is a schematic representation of a voltage variable capacitor in accordance with the invention.

DETAILED DESCRIPTION OF THE PREFERRED EMBODIMENT

The dielectric constant of a material is given by the Clausius-Mossotti equation:

$$P_m := \frac{\varepsilon - 1}{\varepsilon + 2} \cdot \frac{M}{\rho}$$

where $P_m$=molecular polarizability, $\varepsilon$=dielectric constant, M=molecular weight, and $\rho$=density. Hence, in order to produce a material with a variable dielectric constant, either the material density and/or the molecular polarizability must change. Some voltage variable capacitors (VVC) utilize dielectrics such as the $ZrTiO_3$ (see U.S. Pat. No. 5,192,871), while others utilize Si (for example, in varactor diodes). The capacitance is altered by injecting or depleting an electrical charge in the dielectric material, which effectively changes $P_m$, and hence $\varepsilon$.

While the dielectric variation mechanism used in a VVC can be beneficial, it has historically limited the material choices for the dielectric to inorganic materials such as titanates. Alternatively, a variable dielectric can now be created by changing the material density and/or molecular polarizability in a predictable way by using a direct current (DC) control voltage. One way to achieve this is by intercalating a species into a host lattice. The intercalation process results in an expansion of the host lattice (and hence a decrease in the density) and a change in the electronic structure of the host (which changes molecular polarizability). The extent of these changes is known to depend upon degree of the intercalation reaction. Julien, Samaras, Gorochov and Ghorayeb reported (*Optical and Electrical-Transport Studies on Lithium-Intercalated $TiS_2$*, Jun. 15, 1992, vol. 45, pp 13-390 to 13-395) on optical and electrical changes to a lithium-intercalated $TiS_2$ compound. Likewise, N. A. Godshall (*Lithium Transport in Ternary Lithium-Copper-Oxygen Cathode Materials*, Solid State Ionics vol. 18 & 19 (1986) pp. 788–793.) reported on the properties of lithium-intercalated CuO as found in rechargeable batteries. Others have shown that Li intercalation into a graphite lattice is known to result in lattice expansion, a crystallographic rearrangement, and a density decrease. Another common example of the change in dielectric properties of intercalation compounds depending upon the extent of intercalation is the color change occurring in electrochromic devices. The lithium intercalation reaction results in a color change in the material and hence a change in the index of refraction, as well as electronic density of states. All of these factors conspire to change the dielectric constant of the material.

While the specification concludes with claims defining the features of the invention that are regarded as novel, it is believed that the invention will now be better understood from a consideration of the following description in conjunction with the drawing figure. Referring now to FIG. 1, a schematic representation of a device in accordance with the invention, a voltage variable capacitor 10 can be constructed using an intercalation compound 20 as the dielectric between the capacitor electrodes. The voltage variable capacitor 10 consists of four inputs: two signal inputs across a pair of charge storage members 25 and two DC control voltage inputs (a source electrode 32 and a control electrode 34) to control the extent of the intercalation reaction, and hence the dielectric constant of the intercalation compound 20 present between the charge storage members. Other possible intercalation reactions/mechanisms also exist, among these are: (1) intercalation of other ionic species such as potassium, (2) injection of a solvent into the dielectric matrix, (3) variation of the dielectric constant by deintercalation. Since the intercalation reaction is known to be highly reversible, a device having a long service life is possible.

In order to properly intercalate the dielectric medium, a source or supply of the intercalate material (e.g. the lithium ions) is needed. This may be accomplished in more than one way. For example, the source electrode may be made from the same material as the intercalate ions, or contain an abundance of available ions. A lithium electrode or a coating of lithium on another support electrode material can be used as a source. In another embodiment, the source of ions is contained in an electrolyte material 40 that is in close proximity to the intercalation compound 20. For example, a reservoir of a nonaqueous electrolyte comprising $LiClO_4$ dissolved in propylene carbonate is located between the source electrode 32 and the dielectric medium 20. In this embodiment, the dielectric medium 20 is a lithium-electro-intercalated $TiS_2$ compound disposed between and in intimate contact with the pair of charge storage plates 25. In other embodiments, a lithium-intercalated CuO compound is used as the dielectric material. Still other reactions, where $Li^+$ intercalates into a host material such as C, $NiO_2$, $MnO_2$, or $CoO_2$ may also be used. In all these reactions, the $Li^+$ can also de-intercalate since the process is reversible. Intercalation reactions can also be prepared using other ionic species such as potassium, and by using alternate solvents such as $CH_3CN$ (acetonitrile). In summary, the invention consists of a dielectric material placed between two electrodes of a capacitor and a reservoir of an intercalant in proximity. The dielectric material is chosen from those known to exhibit an affinity for intercalation of the chosen intercalant. The extent of the intercalation reaction is controlled by applying a voltage to the intercalant reservoir and the dielectric material. A variable capacitor is created by applying a signal to the device and appropriately controlling the $\epsilon$ of the device by using the input control voltages. In contrast to VVC's made using semiconductor substrates, the instant invention creates a voltage variable capacitor by using intercalation compounds between two electrodes, as opposed to the electron/hole injection schemes used in conventional varactors. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of varying the capacitance in a voltage variable capacitor having an intercalation compound disposed between two charge storage electrodes and also between a source electrode and a control electrode, comprising applying a signal to the source and control electrodes sufficient to intercalate ions from the source electrode into the intercalation compound, so as to alter the dielectric constant of the intercalation compound and to change the capacitance of the voltage variable capacitor.

2. A method of varying the capacitance in a voltage variable capacitor having a $TiS_2$ intercalation compound disposed between two charge storage electrodes and also between a source electrode and a control electrode, comprising applying a signal to the source and control electrodes sufficient to intercalate lithium ions from a reservoir of an electrolyte comprising $LiClO_4$ dissolved in propylene carbonate into the intercalation compound, so as to alter the dielectric constant of the intercalation compound and to change the capacitance of the voltage variable capacitor.

3. A method of varying the capacitance in a voltage variable capacitor having an intercalation compound disposed between two charge storage electrodes and also between a source electrode and a control electrode, comprising applying a signal to the source and control electrodes sufficient to intercalate ions from an electrolyte reservoir in close proximity to the intercalation compound into the intercalation compound, so as to alter the dielectric constant of the intercalation compound and to change the capacitance of the voltage variable capacitor.

4. A method of varying the capacitance in a voltage variable capacitor having an intercalation compound disposed between two charge storage electrodes and also between a source electrode and a control electrode, comprising applying a signal to the source and control electrodes sufficient to cause the intercalation compound to release ions, wherein the ions migrate to the source electrode, so as to alter the dielectric constant of the intercalation compound, thus changing the capacitance of the voltage variable capacitor.

5. A method of varying the capacitance in a voltage variable capacitor having an intercalation compound disposed between two charge storage electrodes and also between a source electrode and a control electrode, comprising applying a signal to the source and control electrodes sufficient to cause the intercalation compound to release ions, wherein the ions migrate to an electrolyte reservoir in close proximity to the intercalation compound, so as to alter the dielectric constant of the intercalation compound, thus changing the capacitance of the voltage variable capacitor.

6. A method of varying the capacitance in a voltage variable capacitor having a $TiS_2$ intercalation compound disposed between two charge storage electrodes and also between a source electrode and a control electrode, comprising applying a signal to the source and control electrodes sufficient to cause the intercalation compound to de-intercalate lithium ions, from the intercalation compound into a reservoir of an electrolyte comprising $LiClO_4$ dissolved in propylene carbonate, so as to alter the dielectric constant of the intercalation compound, thus changing the capacitance of the voltage variable capacitor.

* * * * *